(12) United States Patent
Motz

(10) Patent No.: US 7,114,710 B2
(45) Date of Patent: Oct. 3, 2006

(54) PNEUMATIC VIBRATION ISOLATOR

(75) Inventor: Ulf Jörgen Motz, Gerlingen (DE)

(73) Assignee: Bilz Schwingungstechnix GmbH, Leonberg (DE)

( * ) Notice: Subject to any disclaimer, the term of this patent is extended or adjusted under 35 U.S.C. 154(b) by 0 days.

(21) Appl. No.: 10/934,684

(22) Filed: Sep. 3, 2004

(65) Prior Publication Data

US 2006/0049557 A1 Mar. 9, 2006

(51) Int. Cl.
*F16F 5/00* (2006.01)

(52) U.S. Cl. .................. 267/123; 267/35; 267/64.25; 267/64.27; 267/116

(58) Field of Classification Search ............... 267/201, 267/217, 35, 293, 64.19, 64.23, 64.27, 64.28, 267/116, 120, 122, 123, 141.6, 64.25
See application file for complete search history.

(56) References Cited

U.S. PATENT DOCUMENTS

| 3,008,703 | A | * | 11/1961 | Slemmons et al. ........... 267/118 |
| 3,889,936 | A | * | 6/1975 | Shimizu .................. 267/64.23 |
| 5,779,010 | A | * | 7/1998 | Nelson ..................... 188/378 |
| 5,918,862 | A | | 7/1999 | Nelson |
| 6,322,060 | B1 | | 11/2001 | Mayama et al. |

FOREIGN PATENT DOCUMENTS

| DE | 4100271 | 7/1991 |
| DE | 3106154 C2 | 1/1993 |
| DE | 4233212 A1 | 4/1994 |
| DE | 69109869 T2 | 9/1995 |
| DE | 19628974 C1 | 11/1997 |
| DE | 19745216 A1 | 5/1999 |
| DE | 19918564 A1 | 11/1999 |
| GB | 2124731 A | 2/1984 |
| GB | 2149475 A | 6/1985 |
| JP | 1-98727 | * 4/1989 |
| JP | 01247838 A | 10/1989 |

* cited by examiner

*Primary Examiner*—Devon Kramer
(74) *Attorney, Agent, or Firm*—Henry M. Feiereisen; Ursula B. Day

(57) ABSTRACT

In a pneumatic vibration isolator that includes a housing, an upper part with a first cylindrical side wall and a lower part with a second cylindrical side wall, a pneumatic spring is disposed in an annular gap between the first and the second cylindrical side wall and which opposes radially directed relative movements between the upper part and the lower part and a bearing in axial direction between the upper part and the lower part which permits relative movements of the upper part and the lower part in radial direction such that the stiffness and or the damping of the pneumatic spring are controlled or changed from the outside by means of a pressure control or respectively an adjustable throttle that are part of a pneumatic line system connected to the pneumatic spring.

13 Claims, 9 Drawing Sheets

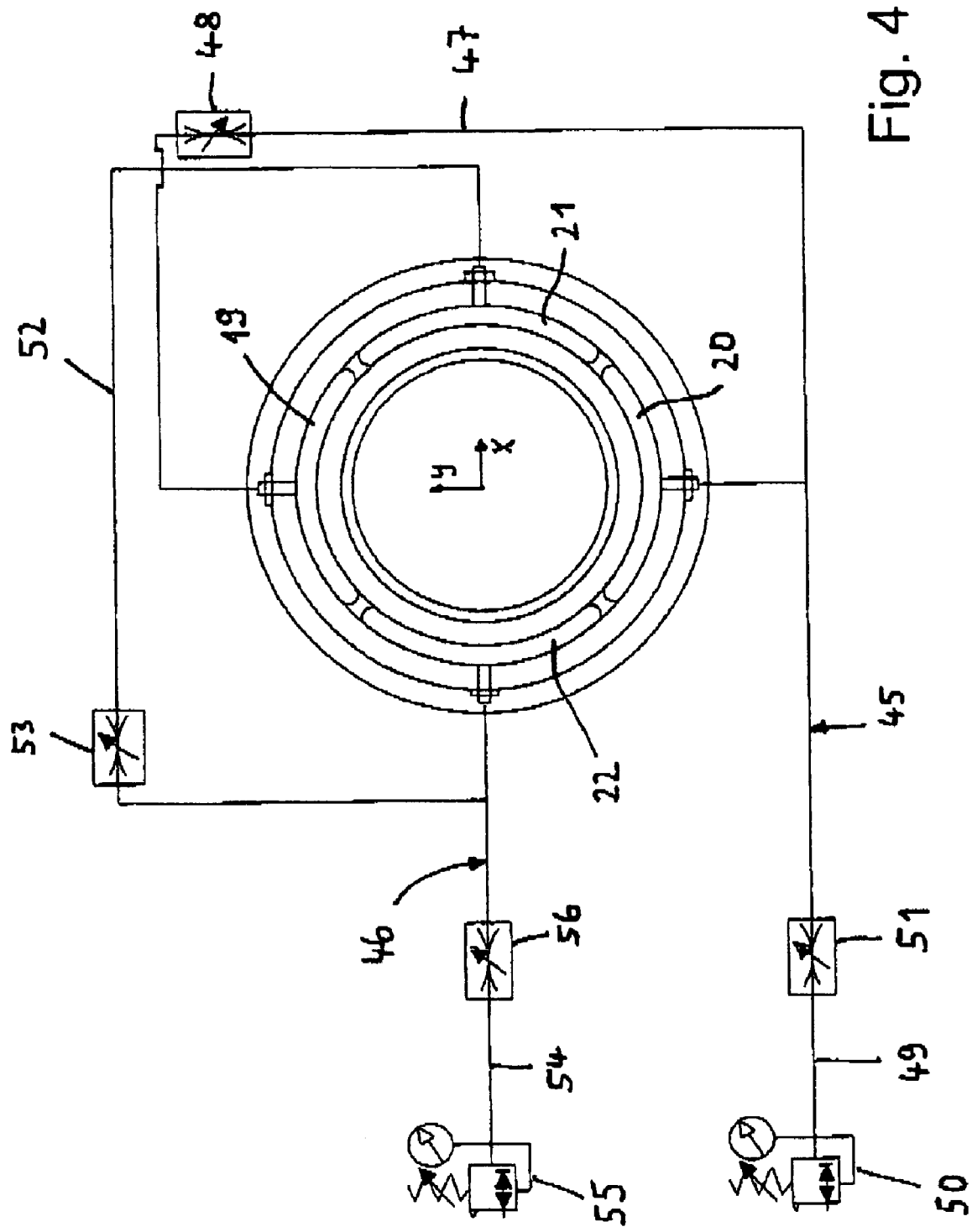

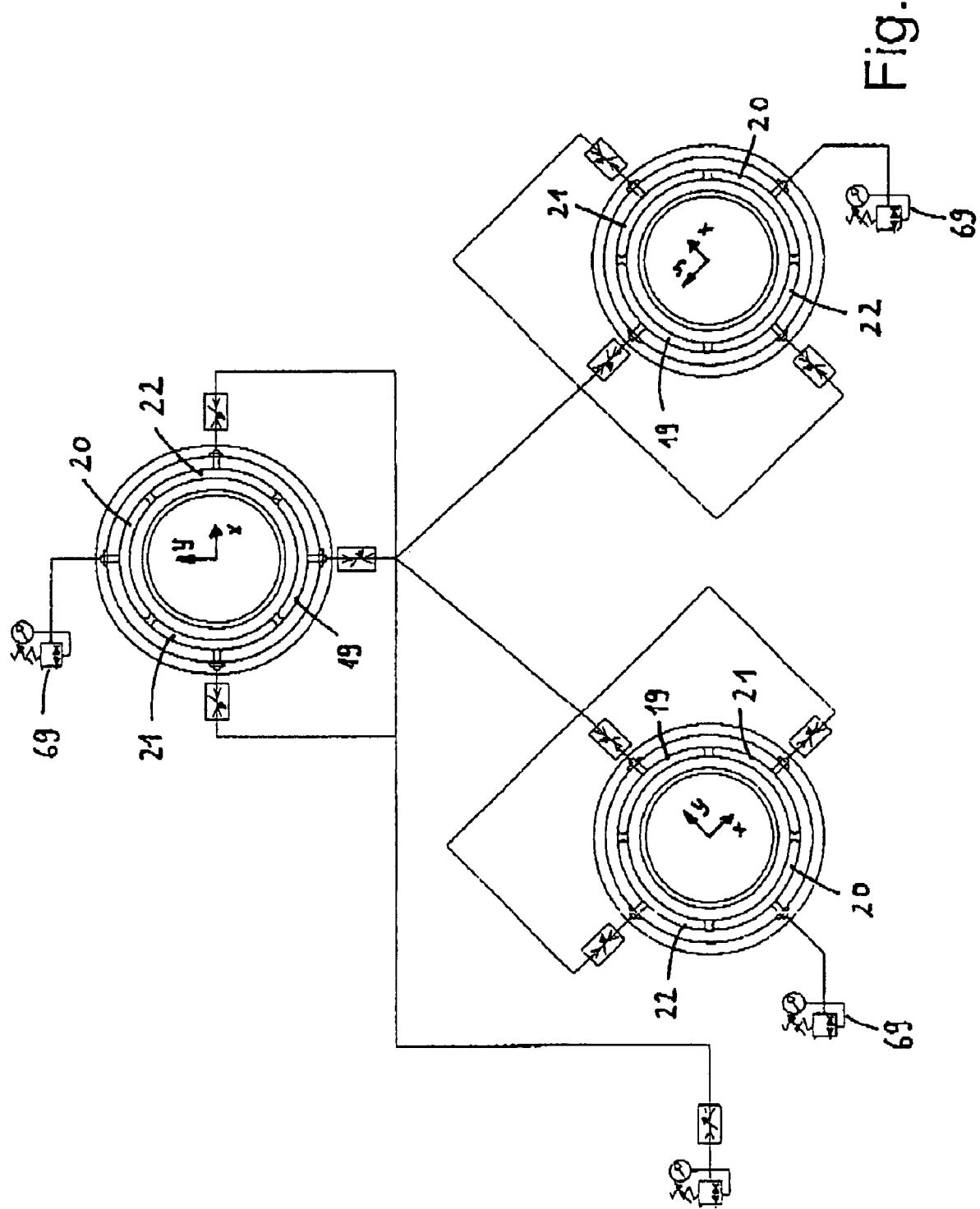

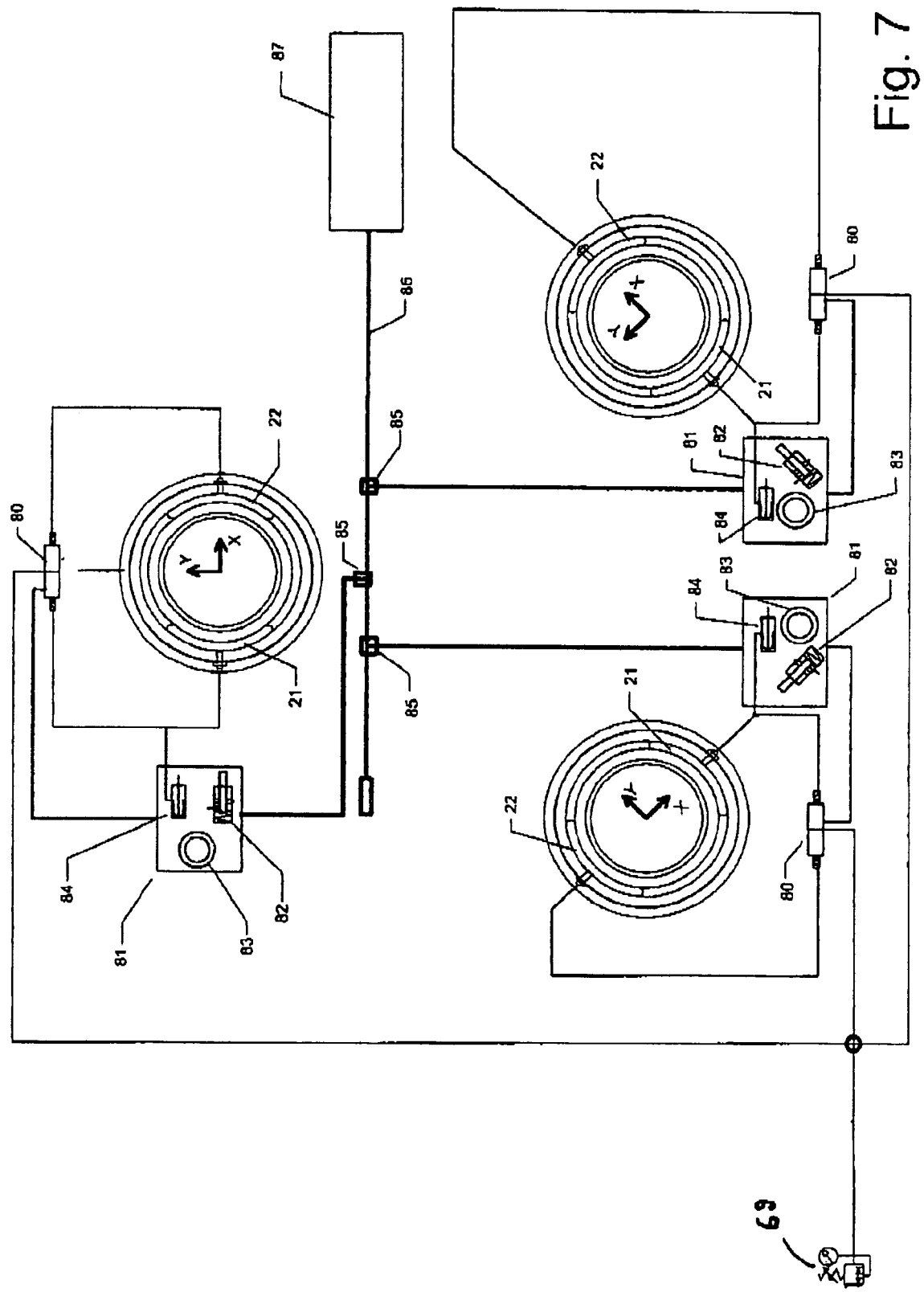

PNEUMATIC VIBRATION ISOLATOR

BACKGROUND OF THE INVENTION

The present invention relates in general to a vibration isolator and in particular, to a pneumatic vibration isolator.

For example, a prior art pneumatic vibration isolator is known from U.S. Pat. No. 5,918,862. However, this vibration isolator suffers from various drawbacks. The radial and axial relative movements between an upper part which is configured in the shape of a pendulum and a lower part, which is configured as a housing, act to deform a roll membrane disposed between the pendulum and the housing to thereby displace a viscous medium in the housing resulting in the reduction of the duration and the amplitude of these relative movements. A change in the natural frequency in this type of vibration isolator thus can be effected only during manufacturing of the vibration isolator by means of employing a shorter or longer pendulum. Likewise, the damping characteristic can be varied only during manufacture by using a viscous medium of different viscosity and by changing the spatial relationship of the pendulum or by changing the filling gauge of the viscous medium.

A further drawback of the known vibration isolator is seen in the lack of a sufficiently exact radial positioning of the upper part in relation to the lower part. However, in certain applications, such as the semi-conductor industry, there is a need that the natural frequency and/or the damping characteristic of a vibration isolator, when installed, can be adjusted or varied from the outside and also to realize a highly exact positioning, for example within the range of $1/100$ mm.

It would therefore be desirable and advantageous to provide an improved vibration isolator to obviate prior art shortcomings and provide a pneumatic vibration isolator whose natural frequency and/or damping characteristic can be adjusted or varied from an outside location when the pneumatic vibration isolator is installed, and by means of which highly exact radial positioning can be realized.

SUMMARY OF THE INVENTION

According to one aspect of the present invention, the vibration isolator has a housing which includes an upper part with a first cylindrical side wall and a lower part with a second cylindrical side wall, a spring mechanism disposed in an annular gap between the first and the second cylindrical side wall for counteracting relative movements between the upper part and the lower part; and wherein the first cylindrical side wall is connected to an upper plate which essentially extends in radial direction, and the second side wall is connected to a lower plate which extends essentially in radial direction, and a supporting device, which is disposed between the upper plate and the lower plate and which acts in an axial direction between the upper part and the lower part and permits the relative movements of the upper part and the lower part in radial direction and wherein the supporting device is a bearing which includes an upper bearing body supporting the upper plate of the upper part, and a lower bearing body separated from the upper bearing plate and attached to the lower plate, and wherein the spring mechanism is a pneumatic spring mechanism connected to a pneumatic line system. Said pneumatic line system may include at least one pressure control and at least one adjustable throttle valve. Alternatively said pneumatic line system may include at least one directional valve which is adapted to control the supply and release of air pressure to and from the pneumatic spring mechanism in response to signals representing parameters such as position, air pressure and acceleration.

The present invention resolves prior art problems by providing a pneumatic spring mechanism in the annular gap between the first and the second cylindrical sidewall to counteract the relative movements between the upper part and the lower part of the bearing. The bearing is configured to support the load, which can be a machine or an installation, in a vertical plane, i.e. in axial direction, in such a manner that the upper part and the lower part are movable relative to each other in horizontal, that is, in a radial direction without producing any substantial frictional resistance in the bearing. The pneumatic spring is connected to a pneumatic line system with at least one pressure control with which the stiffness and thus the natural frequency of the vibration isolator can be controlled and/or changed. An adjustable throttle valve regulates the pneumatic spring action by adjusting the volume flow between the currently compressed or non-compressed or areas of reduced compression of the pneumatic spring so that the damping properties of the pneumatic spring can be changed. The bearing is preferably a pneumatic bearing which produces an air cushion between the upper and the lower bearing body.

The pneumatic spring is preferably provided with one or more pneumatic chambers surrounded by a flexible fluid tight sleeve and circumferentially disposed in a symmetrical pattern around the annular gap that is formed by the first and second cylindrical side walls, and wherein each of the pneumatic chambers are connected to a pneumatic line system. When several pneumatic chambers are present, at least two of these can be connected to each other via the pneumatic line system by means of an in-line adjustable throttle valve.

Each of the pneumatic chambers of the pneumatic spring mechanism is preferably surrounded by its respective tube-shaped sleeve, which essentially extends in circumferential direction and which can be connected to a branch of the pneumatic line system. These pneumatic chambers can be connected singly or in groups of several via subsystems of the pneumatic system to sources of compressed air; alternatively they can be all connected to a single compressed air source.

Another advantageous feature of the present invention is not only the independent adjustability of the vibration isolator's stiffness and damping characteristics, when the vibration isolator is installed, but is also the fact that these characteristics are adjustable with respect to various radial directions. This direction-dependent adjustment of the stiffness and the damping characteristics of the vibration isolator results from the fact that the number of pneumatic chambers that are connected to the compressed air source, the number of pressure controls, and adjustable throttle valves, the interconnection between these components, and the configuration of the pneumatic line system, are highly variable.

BRIEF DESCRIPTION OF THE DRAWINGS

Other features and advantages of the present invention will be more readily apparent upon reading the following description of currently preferred exemplified embodiments of the invention with reference to the accompanying drawing, in which:

FIG. 4 is a functional diagram of the vibration isolator and a second embodiment of the pneumatic line system which includes adjustable throttle valves and pressure controls;

FIG. 6a is a functional diagram of three vibration isolators, which are arranged to each other at an angle of 120° and including the pneumatic line system with the valves and pressure controls, and where one of the tubes of each isolator is for position adjustment carried out via a pressure control;

FIG. 7 is a functional diagram showing three vibration isolators interconnected by a pneumatic line system which includes three directional valves controlling the supply and release of air pressure to and from the pneumatic springs included in the vibration isolator.

DETAILED DESCRIPTION OF PREFERRED EMBODIMENTS

Figure 1:
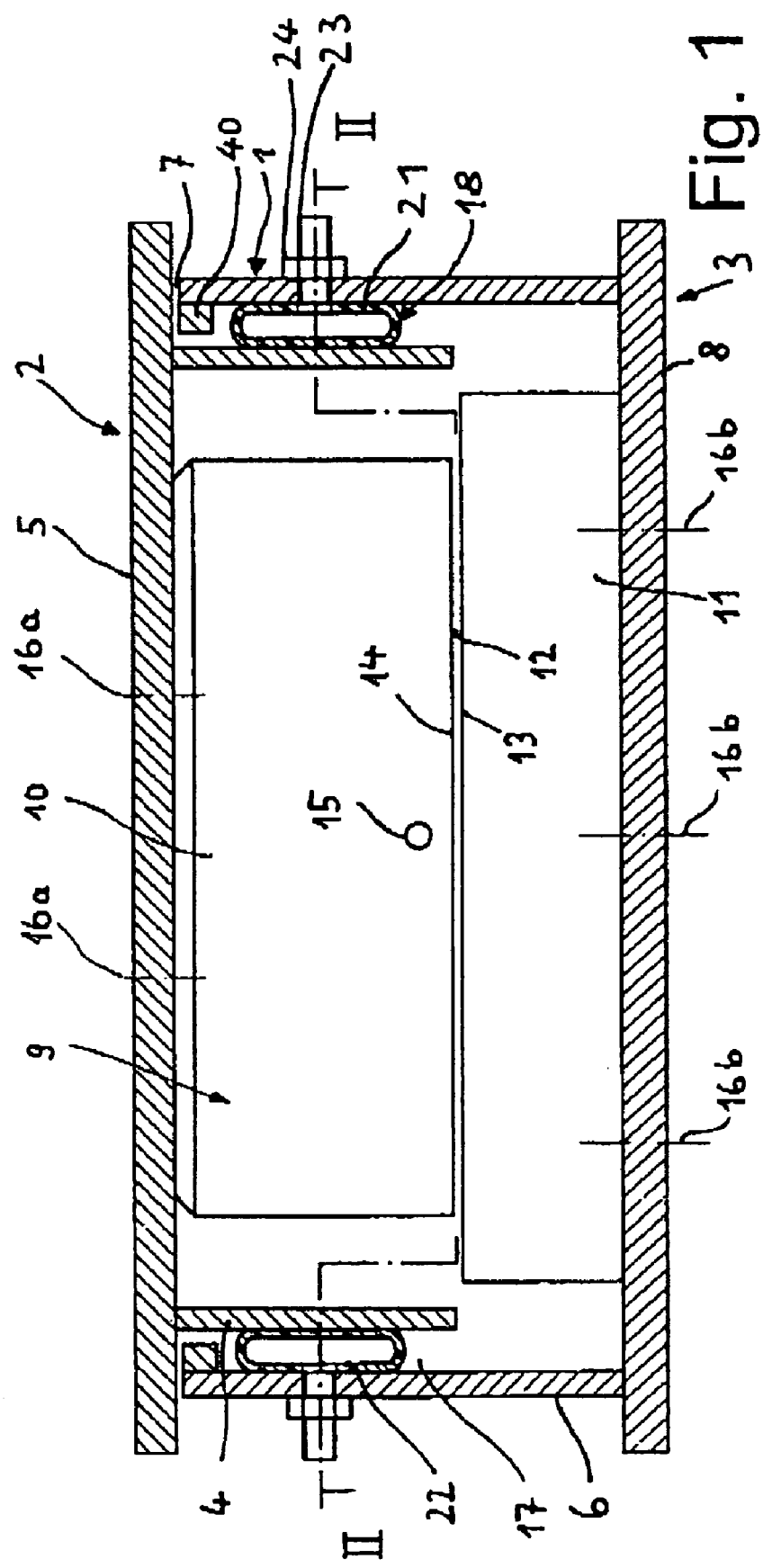
FIG. 1 is a schematic representation of a section of a pneumatic vibration isolator according to the present invention along the line I—I in FIG. 2.

Throughout all the Figures, same or corresponding elements are generally indicated by same reference numerals.

Figure 2:
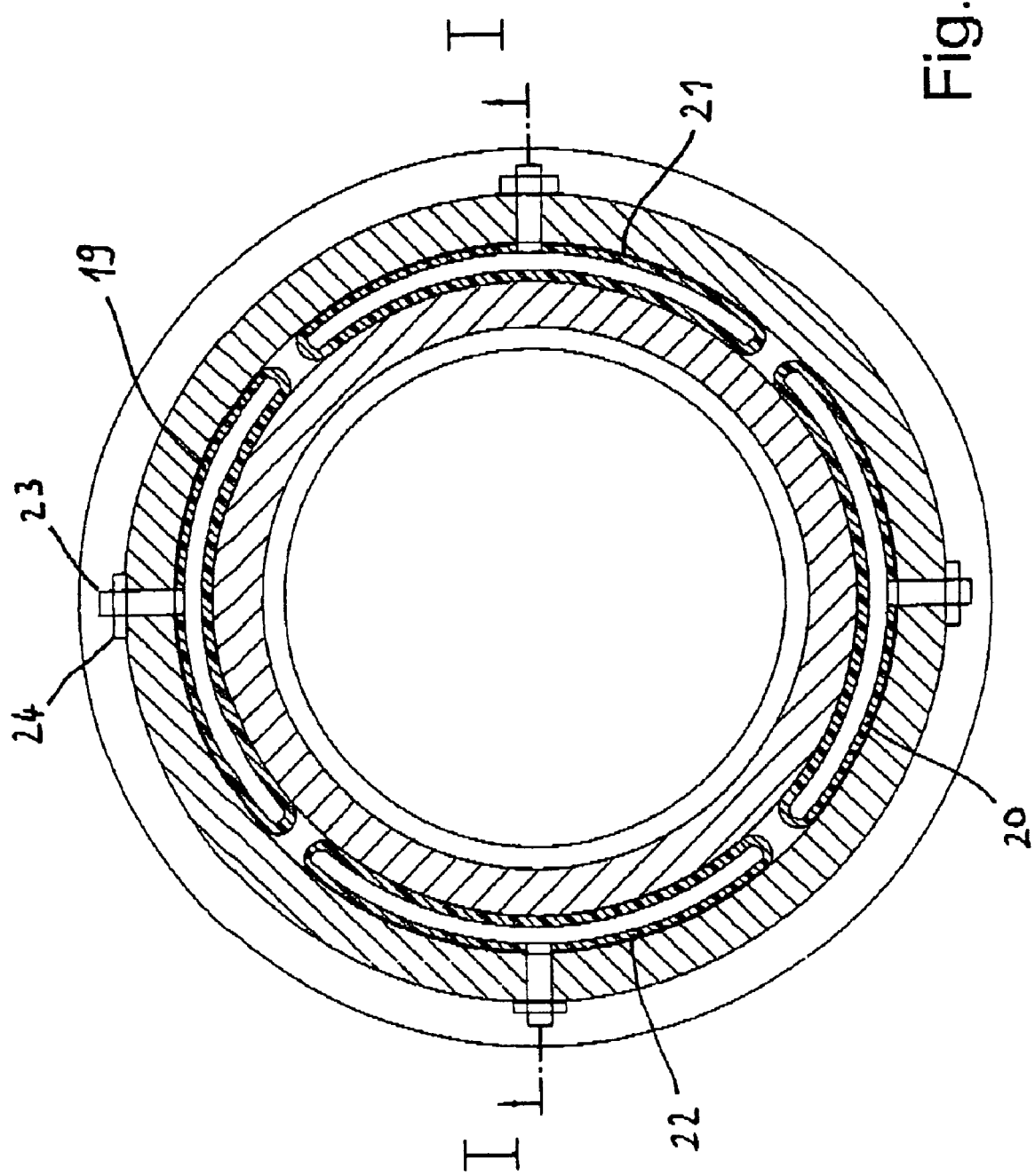
FIG. 2 is a schematic representation of a section of the pneumatic vibration isolator along the line II—II in FIG. 1.

Turning now to the drawing, and in particular to FIG. 1 and FIG. 2, there is shown a vibration isolator having a housing 1 which is essentially comprised of upper part 2 and lower part 3. The upper part 2 has a first cylindrical wall 4 which is, at an upper end thereof, firmly connected to an upper round plate 5. The lower part 3 exhibits a second cylindrical side wall 6 with a diameter that is greater than that of the first cylindrical sidewall 4 of the upper part 2 and which encloses the first cylindrical side wall 4 of upper part 2. The second cylindrical sidewall of the lower part 3 extends in axial direction upwardly, almost to under the upper plate 5 of upper part 2, whereby an annular gap 7 is formed between the upper plate 5 and the upper end of the second cylindrical side wall 6 of the lower part 3. The second cylindrical sidewall 6 extends in axial direction downwardly and beyond the lower end of the first cylindrical side wall 4 of the upper part 2 and with the lower end thereof is firmly connected to a lower round plate 8 of lower part 3. The plates 5 and 6 each extend radially and in essentially parallel direction to each other.

The interior of housing 1 houses a pneumatic bearing 9 which is comprised of an upper bearing body 10 and a lower bearing body 11 separated from the upper bearing body 11 by an air gap 12. The lower bearing body 11 of the pneumatic bearing 9 rests on the lower plate 8 of the lower part 3 and has a surface 13 which is especially flat and level and faces the upper bearing body 10. The lower bearing body 11 of the pneumatic bearing 9 is a solid cylindrical block made of granite or steel. The upper bearing body 10 is provided with nozzle channels not shown here, having openings not shown here, or which terminate into open channels which are located in the surface 14 of the upper bearing body 11 facing the surface 13 of the lower bearing body 11. These nozzle channels in the upper bearing body 10 are connected to a common pneumatic connector 15, which is also connected to a pneumatic supply line, not shown here, leading from the housing 1 to the outside and which is connected to a compressed air source.

The upper plate 5 of the upper part 2 is firmly connected with the upper bearing body 10 of the pneumatic bearing 9, via attachment means 16 indicated only schematically and the lower plate 8 of lower part 3 is connected with the lower bearing body 11 of the pneumatic bearing 9 through schematically shown attachment means 16b.

An annular gap 17 is arranged between the first cylindrical side wall 4 of the upper part 2 and the second cylindrical side wall 6 of the lower part 3, with a pneumatic spring mechanism 18 disposed therein. The pneumatic spring mechanism 18 consists of 4 pneumatic tubes of equal length, 19, 20, 21 and 22 which extend in circumferential direction and each forming a pneumatic chamber, two of each, as shown in the present example, of the pneumatic tubes 19 and 20 and 21 and 22 are arranged in diametrical opposing positions. The pneumatic tubes 19, 20, 21 and 22 are mounted at the second cylindrical side wall 6 of lower part 3 and each extend to approximately one fourth of the length of the annular gap 17. Each of the pneumatic tubes 19, 20, 21 and 22 is connected to a corresponding pneumatic connector 23, which projects through the second cylindrical side wall 6 of the lower part 3 and is provided with an outer thread and which is attached to the lower part 3 by means of a sleeve nut 24.

Viewed in axial direction, a circumferential elastic distance limiting element 40 is disposed within the annular gap 17 above the pneumatic tubes 19, 20, 21, and 22 and attached to the second cylindrical side wall 6 of the lower part 3 at a radial distance from the first cylindrical side wall 4 of upper part 2 when the upper part 2 and the lower part 3 are arranged in a central disposition as seen in FIG. 1 and FIG. 2.

Figure 3:
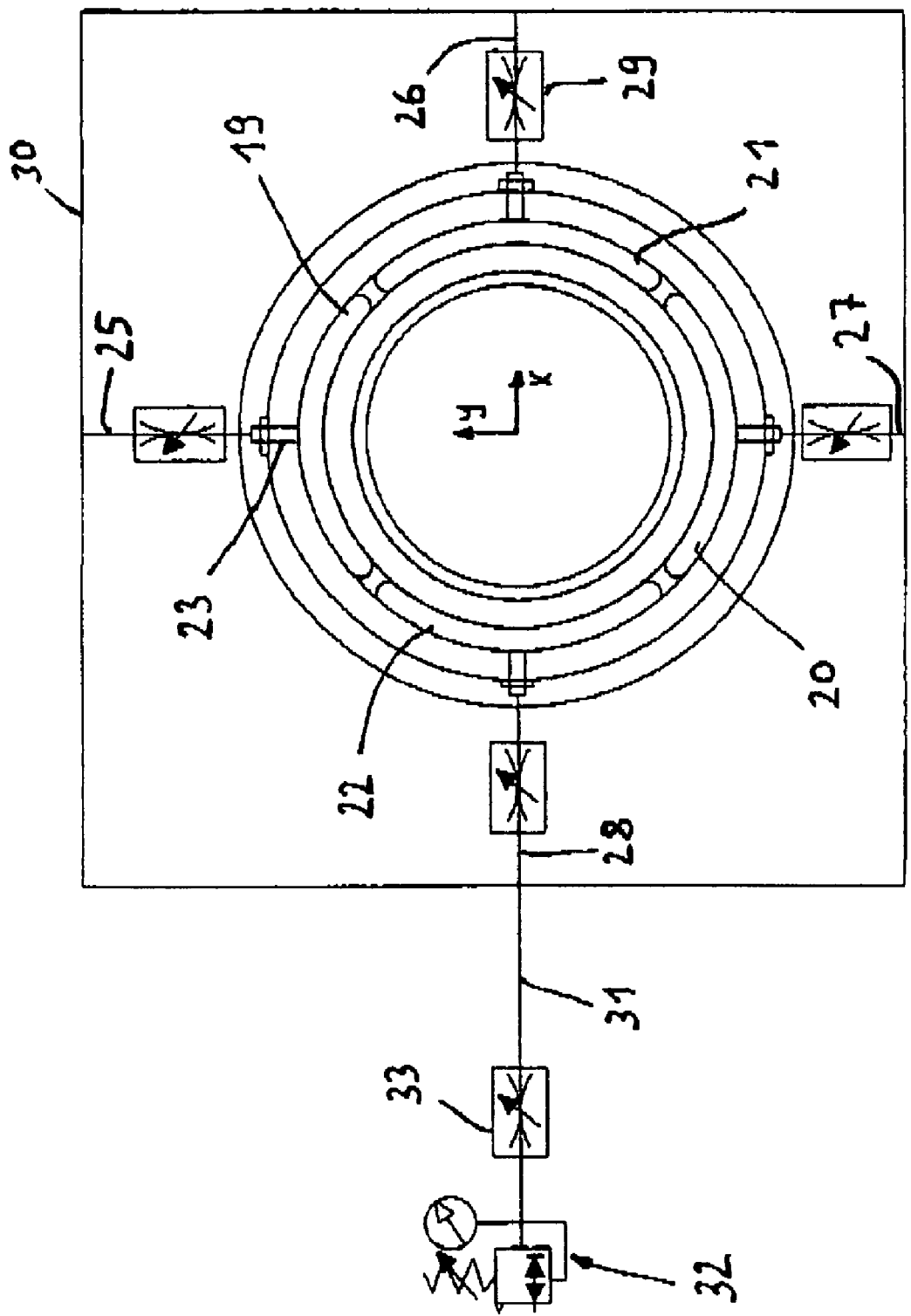
FIG. 3 is a functional diagram of the vibration isolator and a first embodiment of the pneumatic line system which includes adjustable throttle valves and pressure controls.

FIG. 3 shows a functional diagram of the vibration isolator and a first embodiment of a pneumatic line system which is connected to the vibration isolator. As shown in FIG. 3, the pneumatic tubes 19, 20, 21 and 22 are connected each to their respective pneumatic line branch 25, 25, 27 and 28 via the connectors 23. Each of these line branches includes an adjustable throttle valve 29. Furthermore, the line branches are connected to a circular line 30, which itself is connected to a common line 31 in which a maintenance unit 32 comprised of a pressure control, a separator and a filter, and a throttle valve 33 are disposed, in serial order to each other. A pneumatic supply line, not shown here, leads from a compressed air source, not shown here, to the maintenance unit 32. In order to generate pressure in tubes 19, 20, 21 and 22 and also to counteract leakages in the line system, the compressed air from the compressed air source is supplied, via the connector lines to the maintenance unit 32 and the downstream throttle valve 33 and to the corresponding lines of line branches 31, 30, 25, 26, 27, 28 and to the pneumatic tubes 19, 20, 21 and 22. The air pressure in the pneumatic tubes 19, 20 21 and 22, and thus the stiffness of the pneumatic spring mechanism 18, can be adjusted or changed, via the pressure control of the maintenance unit 32. The throttle valve 33 downstream of the maintenance unit 32 serves to greatly reduce the flow in all the tubes and prevents that the pressure control of the maintenance unit 32 is reacting too aggressively. The adjustable throttle valves 29 in the respective line branches 25, 26, 27 28 serve to reduce the flow from one pneumatic tube to another pneumatic tube, said flow being generated by a radial relative movement of the upper part 2 and the lower part 3 and the concurrent change in the width of the annular gap 17 and the resulting change in pressure thereby generated in the pneumatic tubes. By adjusting the throttle position of the throttle valves 29, the flow from one air tube to another air tube changes, thereby changing the damping of the relative movement in the corresponding radial direction.

FIG. 4 shows a second embodiment of the pneumatic line system to which the vibration isolator is connected. The pneumatic tubes 19, 20, respectively 21 and 22 which are oriented to each other in diametrically opposed position are connected to their own subsystem 45, respectively 46 of the entire pneumatic line system. In particular, the pneumatic tubes 19 and 20 are connected with each other via pneumatic line branch 47 of the subsystem 45 with an adjustable throttle 48 arranged in the line branch 47. The pneumatic line branch 47 is connected to a main line 49, which is connected to a compressed air source, not shown here, and a maintenance unit 50 comprising a pressure control separator and filter, and includes an adjustable throttle 51 downstream of the maintenance unit 50. The subsystem 46 is similarly constructed and includes a pneumatic line branch 52 connecting the two pneumatic tubes 21 and 22, with an adjustable throttle valve 53 disposed in the line branch, a main line 54 connected to the line branch 53, a maintenance unit 55 arranged in the main line 54, and which also includes, just as the maintenance unit 50, a pressure control, separator and filter, and a throttle valve 65 arranged in the main line 55 and downstream of the maintenance unit 55, and wherein the main line 54 is connected to a compressed air source, not shown here, from which the compressed air is first supplied to the line branch via the maintenance unit 55 and then via the throttle valve 56. The air flow between the pneumatic tubes 19 and 20 is controlled by means of the throttle valve 48, which flow originates from the pressure differential in the two tubes as a result of the relative movement between the upper part and the lower part of the vibration isolator in the Y-direction. By reducing the air flow between the pneumatic tubes 19 and 20, the damping action of the relative movements of upper part and lower part of the vibration isolator is amplified. The function of the throttle valve 53 is similar, since the damping of the relative movement of the upper part and the lower part of the vibration isolator is adjustable by the throttle in the X-direction. The two pressure controls of the maintenance units 50 and 55 of subsystem 45 respectively 46, are separately adjustable, so that the air pressure in the pneumatic tubes 19 and 20, respectively in Y-direction, and in the pneumatic tubes 21 and 22, respectively the X-direction, and thus the stiffness of the pneumatic spring can be differently adjusted for these two directions. The adjustable throttles 61 and 56 are each designed for the same function as the throttle 33, as shown in the pneumatic line system in FIG. 3 and thus serve to greatly reduce the air flow to the pneumatic tubes 19 and 20, respectively 21 and 22.

Figure 5A:
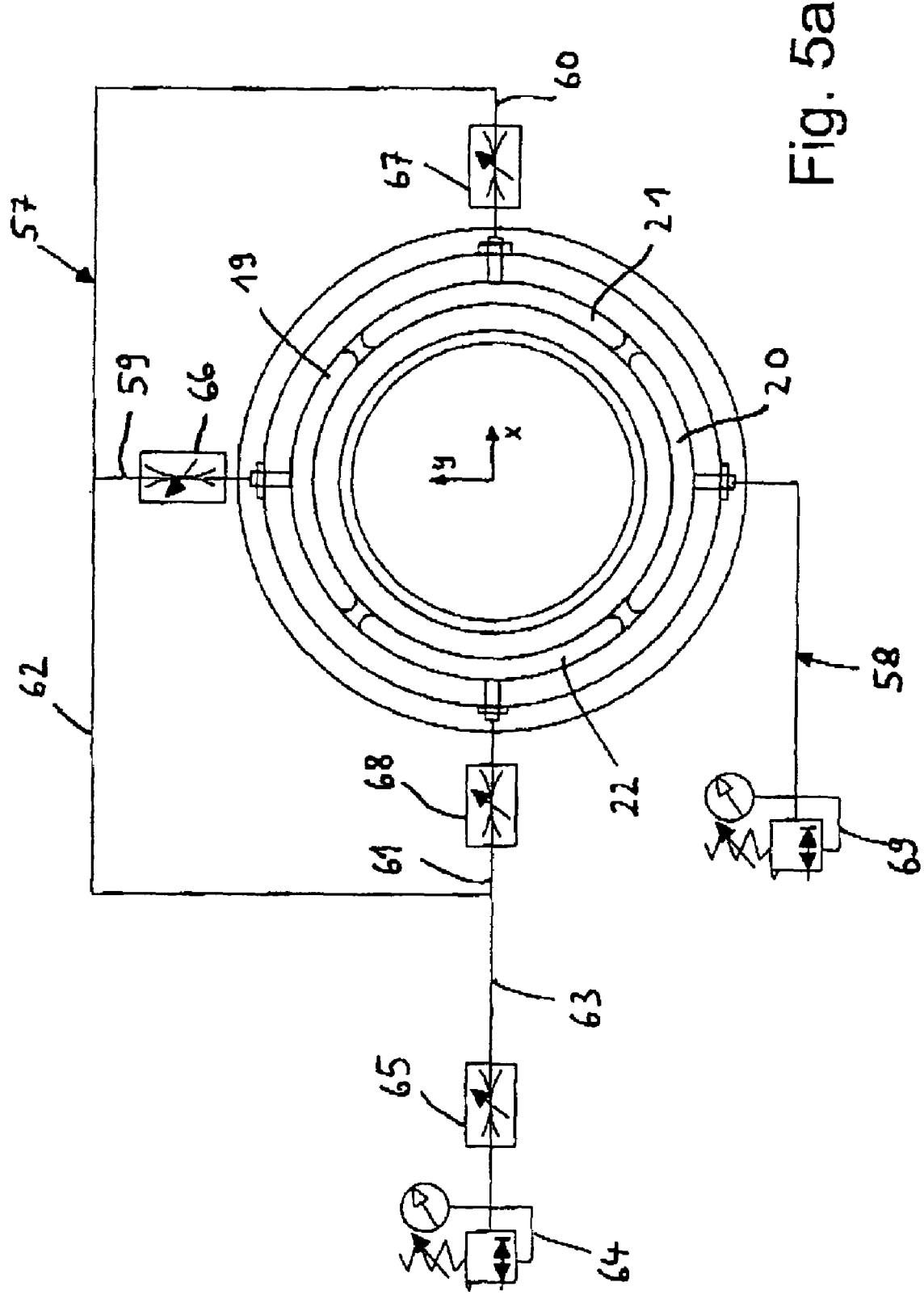
FIG. 5a is a functional diagram of the vibration isolator and a third embodiment of the pneumatic line system which includes adjustable throttle valves and pressure controls, showing one of the tubes of the upper part serving as a position control relative to the lower part, with the position control carried out via a pressure control.

A third embodiment of the pneumatic line system is shown in FIG. 5a. This pneumatic line system likewise includes two subsystems 57 and 58, wherein the diametrically opposing pneumatic tubes 21 and 22 and the pneumatic tube 19, which is located between them, is connected to the subsystem 57, while the pneumatic tube 20 is connected to the subsystem 58. In particular, the pneumatic tube 19, 21 and 22 are connected to a common collector line 62, via each of a pneumatic branch lines 59, 60, respectively 61, and the common collector line in turn coupled to a main line 63, which is connected to a source of compressed air, not shown here, and a maintenance unit 64, in addition to an adjustable throttle valve 65 located downstream of the maintenance unit 64. The assembly and the function of the maintenance unit 64 and the throttle 65 correspond to the assembly and the function of maintenance units 50 and 55 and throttles 51 and 56 of the pneumatic line system in FIG. 4 and the maintenance unit 32 and throttle 33 of the pneumatic line system in FIG. 3. To control the air flow from and to the corresponding pneumatic tubes 19, 21 and 22 and thus the damping action, adjustable throttle valves 66, 67 and 68 are provided in line branches 59, 60 and 61. The pressure control of the maintenance unit 64 controls a common pressure in the tubes 19, 21 and 22 and thereby the stiffness of these tubes.

The subsystem 58 connects the pneumatic tube 20 via a maintenance unit 69, which comprises in similar manner as the above-described maintenance units-pressure control, separator and filter and a source of compressed air, not shown here. The position adjustment of the upper part is controlled by the pneumatic tube 20 in the Y-direction, in that the pressure in the pneumatic tube 20 is adjusted by means of the pressure control of the maintenance unit 69. The position control thus realized by the subsystem 58 is affected through a pressure control, that is, in order to realize the desired position for the Y-position, the desired value is set as a pressure value.

Figure 5B:
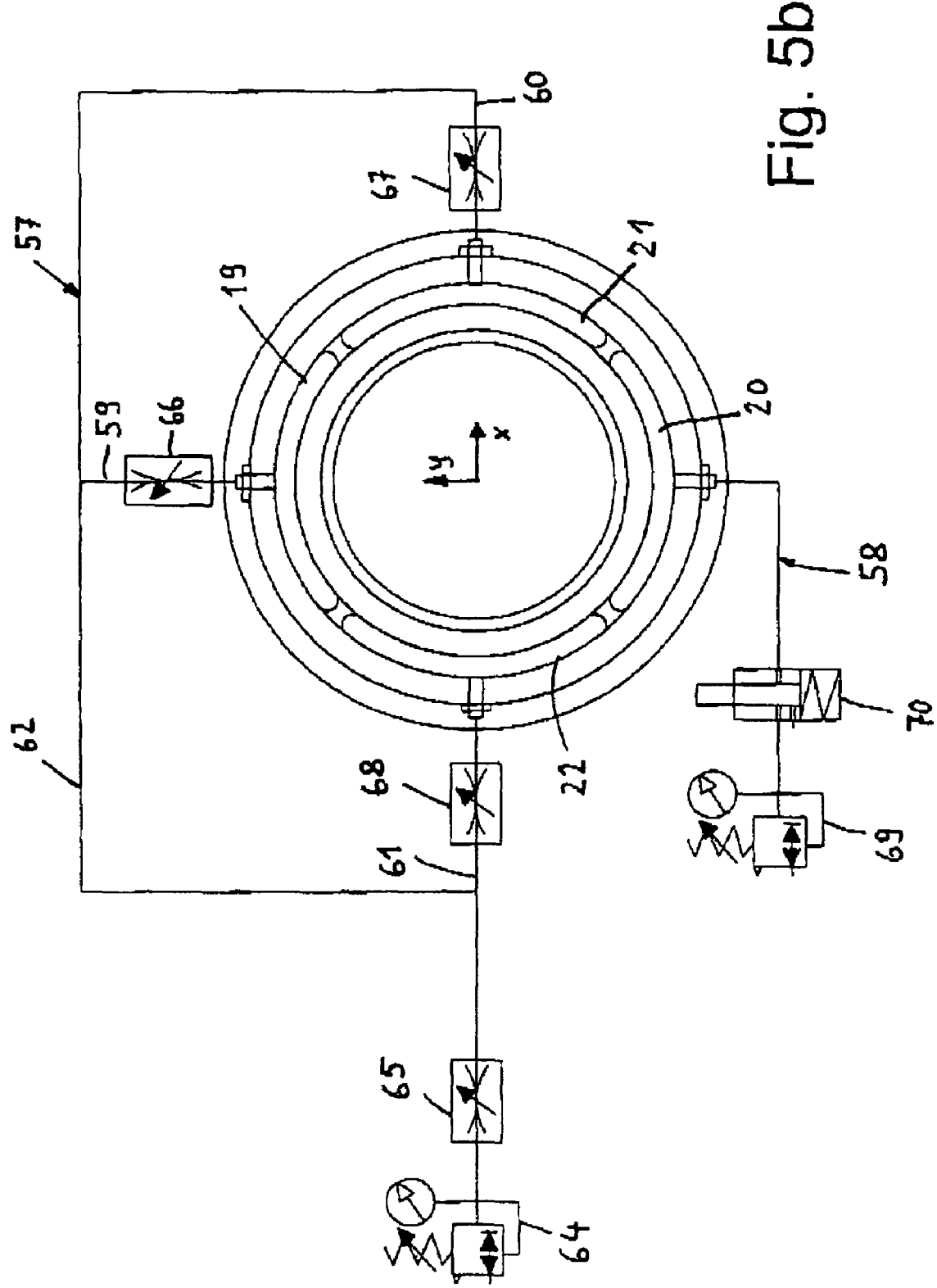
FIG. 5b is a functional diagram similar to that of FIG. 5a, where one of the tubes of the upper part serves as a position control relative to the lower part and the position control is carried out via distance control.

The pneumatic line system shown in FIG. 5b is almost identical to that shown in FIG. 5a and varies from that of FIG. 5a only in that the position adjustment of the upper part of the vibration isolator in the Y-direction is configured as a distance control. Accordingly, a displacement sensor 70 is provided in the subsystem 58 between the pneumatic tube 20 and the maintenance unit 69, the sensor shown in the present example, being a cylinder-piston unit. As compared to the position control which is realized by means of a pneumatic line system as in FIG. 5a, the position control as shown in 5b is realized by means of a distance control, wherein a desired value is set by means of the distance sensor 70 in order to bring the upper part into a desired position relative to the lower part of the vibration isolator by means of a corresponding pressure admission in the pneumatic tube 20.

Figure 6B:
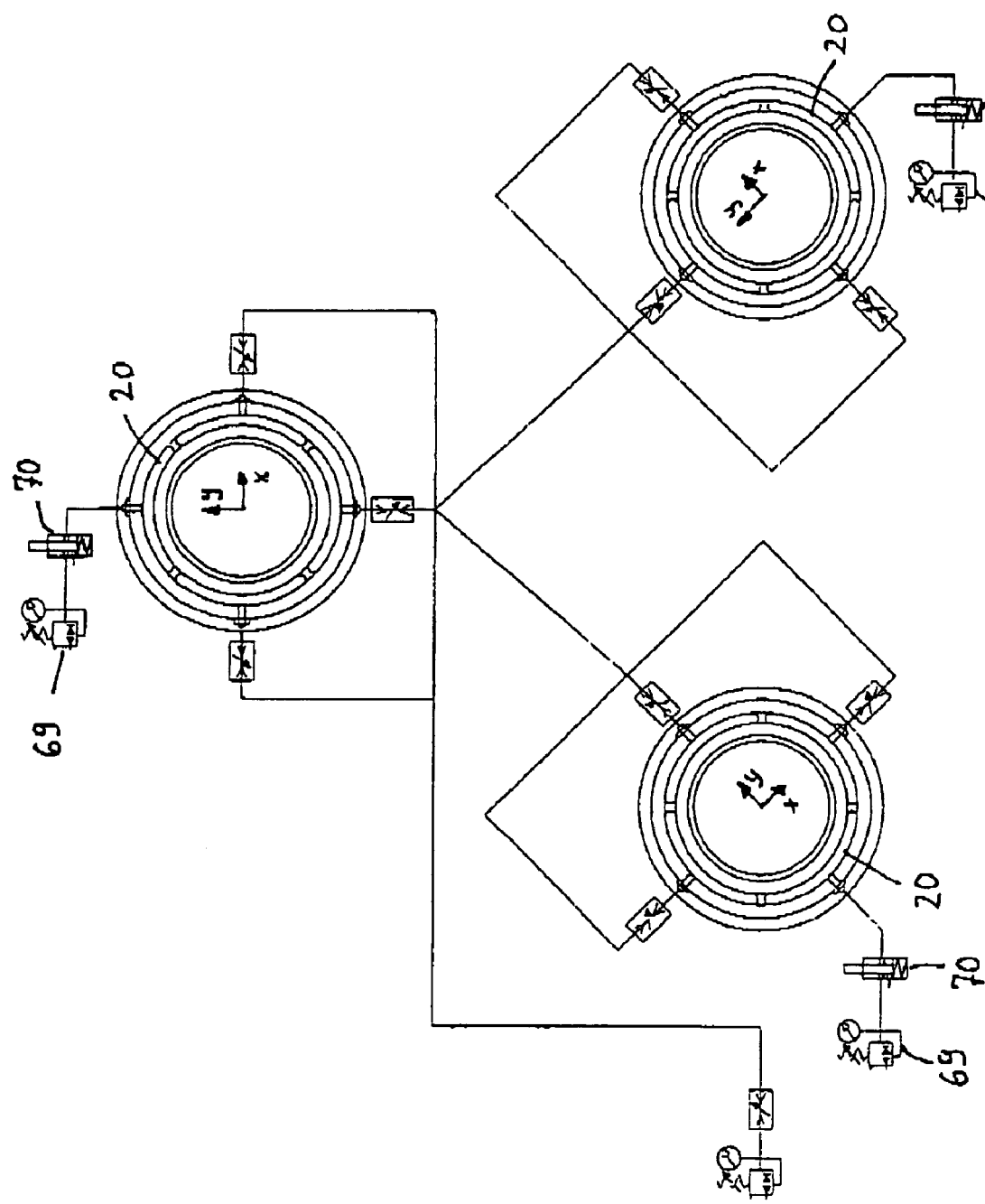
FIG. 6b is a functional diagram similar to FIG. 6a, wherein the position adjustment of said one tube of each of the vibration isolators is carried out via a distance control.

FIGS. 6a and 6b show an application, wherein three vibration isolators are arranged in a triangle under a load and are oriented such that their respective Y-axes each form an angle of 120° to each other. In the embodiment of FIG. 5a, one of the pneumatic tubes, namely the pneumatic tube 20 is used for a pressure controlled position adjustment. The other three pneumatic tubes 19, 21 and 22 of each of the vibration isolators are connected to a shared subsystem of the pneumatic line system of FIG. 5a. With the embodiment as shown in FIG. 6a, the load can be exactly positioned in the X- and Y-direction in a load-related coordinate system, where the position adjustment of each of the vibration isolators in the X- and Y-direction are carried out in the respective coordinate systems. Pressure- or position control not only provides a position control but also a reduction in amplitude and duration of the relative movement.

The embodiment of FIG. 6b varies from the embodiment in FIG. 6a only in that the position control, similar to the embodiment as in FIG. 5b, is configured as a distance control. Accordingly, similar to the embodiment as in FIG. 5b, a corresponding position sensor 70 is disposed between each of the pneumatic tube 20 and the corresponding maintenance unit 61.

The vibration isolator according to the present invention is mostly utilized in combination with additional identical vibration isolators either between a machine or installation and a base or a frame in order to either isolate or reduce horizontal vibrations emanating from the machine relative to the base or the frame, or within the machine, and/or to permit a speedier subsiding of the vibrations. The vibration isolators also serve to isolate horizontal vibrations emanating from the machine or the installation. The vibration isolator according to the present invention is thus also designated as a "horizontal" vibration isolator.

To utilize the vibration isolator, it is mounted between the machine or installation and the base or frame in such a manner, that the load of the machine or the installation is introduced via the upper plate 5 of the upper part 2 into the pneumatic bearing 9 which in coordination with the other pneumatic bearings has to carry the load of the machine or the installation. In dependence on the diameter and the pneumatic pressure in the air cushion of the pneumatic bearing, loads of various weights can be supported. The air gap 12 between the upper bearing body 10 and the lower bearing body 11 of the pneumatic bearing 9 amount to several µm.

The pneumatic bearing 9 allows relative movements between the upper part 2 and the lower part 3 in horizontal direction, whereby the relative movements may be generated through horizontal vibrations of the load that is supported by the upper part 2, or are generated through horizontal vibrations impacting upon the lower part 3 of the surroundings or generated through such dynamic forces as, for example occur through load shifting of the machine or installation. These relative movements act in opposition to the pneumatic spring mechanism 18 by means of the compression of each of the pneumatic tubes 19, 20, 21 or 22 which reside in the area of the annular gap at that moment and whereby the width of the annular gap is reduced by the relative movements. The elastic distance limiting element 40 brakes the relative movements of the upper part 2 and the lower part 3 completely only as an emergency, namely, when the distance limiting element is pressed together between the first and the second cylindrical side wall.

The pressure control of the maintenance units controls the pneumatic pressure in the pneumatic tubes 19, 20, 21, 22 to thereby control the horizontal stiffness of the pneumatic spring mechanism 18 in a continuous manner. A horizontal positioning of the upper part relative to the lower part is realized due to the spatial arrangement of the pneumatic tubes, and thus a corresponding horizontal positioning of the load is also realized. Moreover, by means of the aforedescribed pressure and distance control, positioning can be still more finely tuned. The air flow, that is, the air exchange in the pneumatic tubes 19, 20, 21, 22 located opposite each other can be controlled by means of several throttles which render the damping continuously adjustable. The vibration isolator according to the present invention thus permits the control of its natural frequency (in the range approximately 0.7 to 2.2 Hz) and damping action (damping factor in the range approximately 0.05 to 0.44) from the outside, when installed. Operation of the vibration isolator according to the present invention is largely frictionless, uniform and wear-resistant, which makes the vibration isolator especially suitable for use in clean rooms such as are utilized in the semi-conductor industry.

The vibration isolator of the present invention can also be combined with another vibration isolator for isolation and/or damping vertical vibrations between the machine or installation and the base or frame. The vibration isolator for vertical vibrations would be disposed between the machine or installation and the upper plate 5 of the upper part 2 of the vibration isolator of the present invention.

It is understood that various other embodiments and changes in the vibration isolator and/or the pneumatic line system are within the scope of the invention. For example, depending on the type of use, an additional elastic circumferential distance limiting element can be arranged below the pneumatic tubes in annular gap 17. The pneumatic bearing can also be changed to a roller bearing or a similar anti-friction bearing.

FIG. 7 shows an application in which three vibration isolators are arranged in a triangle under a load and are oriented such that their respective Y-axes are inclined at an angle of 120° relative to one another. In contrast to the vibration isolators of the embodiments shown in FIGS. 6a and 6b, the vibration isolators of the embodiment shown in FIG. 7 each include only two pneumatic tubes arranged in diametrically opposed relationship along the X-axis of the respective isolator. Each pair of pneumatic tubes 21, 22 of the vibration isolators is fluidly connected to a common electropneumatic proportional directional valve 80. Each proportional directional valve is fluidly connected to a common source of pressurised air, which is not shown, via a maintenance unit 69 including a pressure control, separator and filter. Each proportional directional valve 80 is connected electrically to a respective one of three control units 81 each of which includes a microprocessor MP, a position sensor 82, an acceleration sensor 83 and an air pressure sensor 84. Each position sensor 82 is aligned with the X-axis of the respective vibration isolator. The control units 81 are connected via T-connectors 85 and a CAN-bus 86 to a PLC controller 87 which is operable to manage and watch over the control units 81. The proportional directional valves 80 control the supply of pressurised air to the pneumatic tubes 21, 22 and the venting of the pneumatic tubes 21, 22 in response to electric signals received from the control units 81, which signals are representative of the parameters measured by the position sensors 82, acceleration sensors 83 and pressure sensors 84.

While the invention has been illustrated and described as embodied in a vibration damper, it is not intended to be limited to the details shown since various modifications and structural changes may be made without departing in any way from the spirit of the present invention. The embodiments were shown and described in order to best explain the principles of the invention and practical application to thereby enable a person skilled in the art to best utilize the invention and various embodiments with various modifications as are suited to the particular use contemplated.

What is claimed is:

1. A pneumatic vibration isolator comprising:
   a housing having an upper and a lower part,
   a first cylindrical side wall attached to the upper part,
   a second cylindrical side wall attached to the lower part, said first cylindrical side wall and said second cylindrical side wall defining an annular gap therebetween,
   a pneumatic line system,
   a spring pneumatic mechanism disposed in said annular gap for counteracting radially directed relative movements between the upper part and the lower part, said pneumatic spring mechanism includes four pneumatic chambers,
   an upper plate extending substantially in a radial direction and connected to the first side wall;
   a lower plate extending substantially in a radial direction and connected to the second side wall;

a support disposed between the upper and lower plates for acting in an axial direction between said upper and lower parts and allowing relative movements in a radial direction between the upper part and the lower part; wherein the support is a bearing which includes an upper bearing body supporting the upper plate of the upper part, and a lower bearing body separated from the upper bearing body and attached to the lower plate, and wherein the spring mechanism is a pneumatic spring connected to said pneumatic line system, wherein the pneumatic chambers each are surrounded by a flexible fluid tight sleeve and circumferentially arranged in symmetrical disposition in the annular gap between the first and second cylindrical side wall and connected to the pneumatic line system, said pneumatic line system includes two adjustable throttle valves and two of each of the four pneumatic chambers are located in diametrically opposing position and are each pneumatically connected with each other through a respective one of said adjustable throttle valves.

2. The pneumatic vibration isolator of claim 1, wherein the bearing is a pneumatic bearing and the upper bearing body is separated from the lower bearing body by an air cushion.

3. The pneumatic vibration isolator of claim 2, wherein the upper bearing body has a surface facing the lower bearing body, said surface provided with one or more air channels terminating into air exit openings and connected to a compressed air source via the pneumatic line system.

4. The pneumatic vibration isolator of claim 2, wherein the lower bearing body of the pneumatic bearing is made from granite or steel.

5. The pneumatic vibration isolator of claim 1, wherein each flexible fluid tight sleeve of each pneumatic chamber is a rubber tube.

6. The pneumatic vibration isolator of claim 1, further comprising an elastic distance limiting element in circumferential disposition in the annular gap between the first and the second cylindrical wall and mounted on one of the cylindrical walls in a radial distance to the other one of the walls.

7. A pneumatic vibration isolator comprising:
a housing having an upper and a lower part,
a first cylindrical side wall attached to the upper part,
a second cylindrical side wall attached to the lower part, said first cylindrical side wall and said second cylindrical side wall defining an annular gap therebetween,
a pneumatic line system,
a pneumatic spring mechanism which includes four pneumatic chambers disposed in said annular gap for counteracting radially directed relative horizontal movements between the upper part and the lower part, said pneumatic spring mechanism being connected to said pneumatic line system;
an upper plate extending substantially in a radial direction and connected to the first side wall;
a lower plate extending substantially in a radial direction and connected to the second side wall,
a support disposed between the upper and lower plates for acting between said upper and lower parts and allowing relative movements in a radial direction between the upper part and the lower part; wherein said the four pneumatic chambers each are surrounded by a flexible fluid tight sleeve and circumferentially arranged in symmetrical disposition in the annular gap between the first and second cylindrical side wall and connected to the pneumatic line system and extends substantially in a circumferential direction in said annular gap, and said support is a bearing which prevents relative vertical movements between the upper part and the lower part, wherein said pneumatic line system includes two adjustable throttle valves wherein two of each of the four pneumatic chambers are located in diametrically opposing position and are each pneumatically connected with each other through a respective one of said adjustable throttle valves.

8. The pneumatic vibration isolator of claim 7, wherein the beaming is a pneumatic bearing which includes an upper bearing body and a lower bearing body, said upper and lower bearing bodies being separated from one another by an air cushion.

9. The pneumatic vibration isolator of claim 8, wherein the upper bearing body has a surface facing the lower bearing body, said surface provided with one or more air channels terminating into air exit openings and connected to a compressed air source via the pneumatic line system.

10. The pneumatic vibration isolator of claim 8, wherein the lower bearing body of the pneumatic bearing is made from granite or steel.

11. The pneumatic vibration isolator of claim 7, wherein each flexible fluid tight sleeve of each pneumatic chamber is a rubber tube.

12. The pneumatic vibration isolator of claim 7, further comprising an elastic distance limiting element in circumferential disposition in the annular gap between the first and the second cylindrical wall and mounted on one of the cylindrical walls in a radial distance to the other one of the walls.

13. The pneumatic isolator of claim 7, wherein the pneumatic line system includes a proportional directional valve for controlling the supply of pressurized air to and the release of air pressure from the pneumatic spring mechanism.

* * * * *